Figure 1:
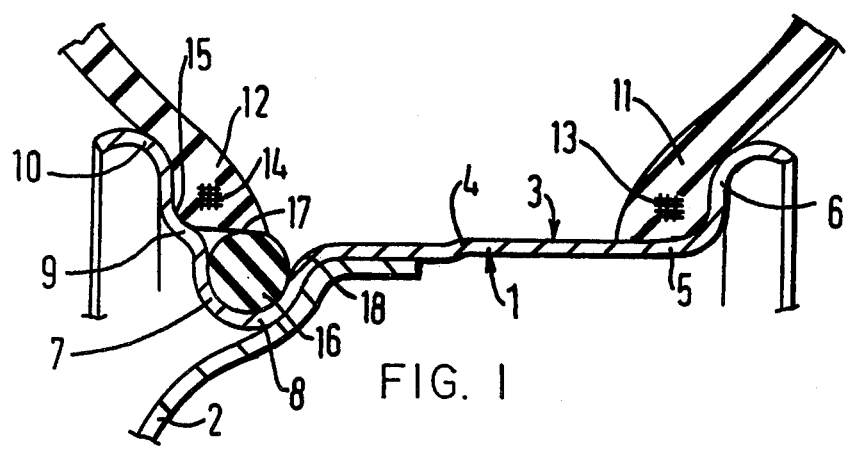

# United States Patent [19]

Mitchell

[11] 4,081,015
[45] Mar. 28, 1978

[54] WHEEL RIMS AND PNEUMATIC TIRE AND WHEEL RIM ASSEMBLIES
[75] Inventor: William Eric Mitchell, Coventry, England
[73] Assignee: Dunlop Limited, London, England
[21] Appl. No.: 727,617
[22] Filed: Sep. 28, 1976

Related U.S. Application Data

[63] Continuation of Ser. No. 559,724, Mar. 19, 1975, abandoned.

[30] Foreign Application Priority Data

Mar. 28, 1974 United Kingdom ............... 13906/74

[51] Int. Cl.² ............................................ B60C 15/02
[52] U.S. Cl. ..................... 152/379.1; 152/381.2 WF; 152/362 R
[58] Field of Search ................... 152/375, 378, 379 R, 152/379 A, 381 R, 381 A, 399, 400, 379.1, 381 WF, 362 R; 29/159.1

[56] References Cited

U.S. PATENT DOCUMENTS

| 1,777,223 | 9/1930 | Pugh | 152/379 R |
| 2,047,999 | 7/1936 | Eger | 152/379 R |
| 2,840,133 | 6/1958 | Billingsley | 152/379 R |
| 3,708,847 | 1/1973 | Mitchell | 152/379 R |
| 3,851,691 | 12/1974 | French | 152/379 R |
| 3,865,170 | 2/1975 | Mitchell | 152/379 R |
| 3,884,286 | 5/1975 | Verdier | 152/379 R |

Primary Examiner—Drayton E. Hoffman
Attorney, Agent, or Firm—Stevens, Davis, Miller & Mosher

[57] ABSTRACT

A wheel rim for a pneumatic tire having a pair of annular tire bead retaining flanges and a well located adjacent one of the flanges beneath the normal seating position of an associated tire bead. A well-filling ring can be located in the well to fill the well and provide support for the beads of a tire mounted on the rim.

3 Claims, 2 Drawing Figures

WHEEL RIMS AND PNEUMATIC TIRE AND WHEEL RIM ASSEMBLIES

This is a continuation of application Ser. No. 559,724 filed Mar. 19, 1975, now abandoned.

This invention relates to wheel rim and pneumatic tire and wheel rim assemblies.

In order to prevent accidents resulting from sudden deflation of a pneumatic tire many proposals have been made to ensure that should such deflation occur the tire is retained on the rim.

In the case of a tire mounted on a well-base rim, it has been proposed to insert into the well of the rim, after the tire has been fitted, a closure member or well-filling member which prevents the tire beads from entering the well and thus causing loss of steering control and possibly enable the tire to escape from the rim.

Accordingly the present invention provides a wheel rim for a pneumatic tire having a pair of annular tire bead retaining flanges and a well located adjacent one of the flanges beneath the normal seating position of an associated tire bead, the well having a base portion of arcuate cross-section adapted to receive a well-filling ring of at least part-circular cross-section.

The invention also provides a pneumatic tire and wheel rim assembly comprising a wheel rim having a pair of annular tyre bead retaining flanges and a well located adjacent one of the flanges, a pneumatic tire mounted on the wheel rim with one tire bead positioned over the well, the well including a resilient sealing ring of at least part-circular cross-section and of sufficient size to substantially fill the well and provide support for the tire bead.

Preferably the resilient sealing ring defines with the axially inner surface of the well a circumferentially radially inwardly tapering groove which, in the event of said tire bead being axially displaced from its seat, is entered by the toe portion of the bead to prevent further axial displacement of the bead.

The invention also provides a wheel rim for a pneumatic tire having a pair of annular tire bead retaining flanges and a well positioned closely adjacent one flange, the rim being formed with an axially extending ledge between said one flange and the well so as to be capable of providing support for the heel portion of an associated tire bead.

The invention also provides a wheel rim as defined in the preceding paragraph and a tire mounted on the wheel rim with the heel portion of one tire bead supported on the ledge and the toe portion of said bead supported by a well-filling ring located in the well.

The well-filling ring is usually formed of an elastomeric material and preferably has a substantially circular cross-section.

The well-filling ring may define with the axially inner surface of the well a circumferential radially inwardly tapering groove which, in the event of said tire bead being axially displaced from its seat, is entered by the toe portion of the bead to prevent further axial displacement of the bead.

The invention also provides a wheel incorporating a wheel rim as defined above.

Figure 2:
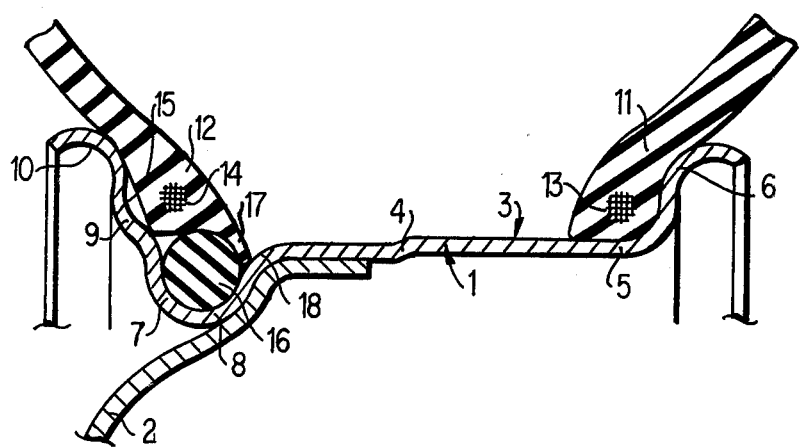

One embodiment of the invention will now be described, by way of example, with reference to the accompanying drawing FIG. 1 is an axial cross-sectional view of part of a pneumatic tire and wheel assembly, and FIG. 2 is a view similar to FIG. 1.

The assembly 1 comprises a wheel centre portion 2 of conventional form welded at its outer periphery to a rim 3. The rim 3 has a substantially cylindrical base portion 4 which leads into an inboard bead seat 5 which is formed at an angle of approximately 5° to the axial direction, and terminates in an inboard rim flange 6. The outboard portion of the rim base 4 incorporates a shallow well 7 the base portion 8 of which is of substantially circular cross-section, and which extends through an axially-extending ledge portion 9 into an outboard bead retaining flange 10.

A pneumatic tire seated on the rim comprises inboard and outboard beads 11 and 12 respectively, the inboard bead 11 being seated in the conventional manner on the tapered bead seat 5. The outboard tire bead 12, although it is itself conventional in construction (the beads 11 and 12 incorporate inextensible bead wires 13 and 14 respectively in the conventional manner), is supported in a novel manner partly by the ledge 9 which forms a seat for the heel portion 15 of the bead, and partly by an elastomeric well-filling ring 16 which is fitted into the well during the assembly of the tire to the rim and which in its fitted position engages the toe portion 17 of the bead 12.

In assembling the tire to the rim, the bead 11 is first fitted in the conventional manner using the well 7, and is moved over the rim until it reaches the position shown in the drawing. The outboard bead 12 is then also fitted in the conventional manner and is pushed towards the bead 11 so as to leave access to the well 7. To facilitate movement of the outboard bead 12 towards the inboard bead 11 the base portion 4 of the rim 3 is reduced slightly in diameter adjacent the well 7. The elastomeric ring 16, which may, for example, be of a fairly hard rubber, is then fitted into the well at one point of the rim circumference and is then stretched around the outboard flange and over the flange 10 so that it springs into its retracted position as shown in the drawing and fits snugly into the base of the well around the whole circumference of the rim. The outboard bead 12 is then allowed to return to its position as shown in the drawing and the tire is inflated through a suitable inflation valve (not shown) fitted into the base of the rim.

It will be noted that with the ring 16 in position it is impossible for the bead 12 to enter the well and the tire is thus effectively prevented from escaping from the rim in the event of deflation. The contour of the ring 16 and the portion 18 of the rim at the opening to the well provides a circumferential radially inwardly tapering groove which, should the bead 12 be displaced from its seat, is entered by the bead toe 17 to hold the bead 12 against further axial movement as shown in FIG. 2. This provides an additional element of safety in that the loss of directional control which may occur if the outboard bead of the tire is allowed to move freely about the rim is avoided.

Another important advantage of the construction described above is that the ledge 9 between the flange 10 and the well provides a firm support which, together with the support for the toe of the bead provided by the ring 16 is effective to hold the bead 12 in position and to prevent excessive radial movement of the heel region of the bead and the region immediately above the heel which might cause chafing of the lower sidewall region of the tire against the flange 10 during normal running.

The use of a circular cross-section for the ring 16 is of particular value in that a ring having this shape is much more easily stretched and rolled over the rim flange than would be a ring of square or other more angular profile. Further, the ring fits easily into the well, and this is of particular value in providing an effective seal. While it is not essential that the tire and rim assembly should be used without an inner tube, the arrangement of the outboard bead and well-filling ring is such as to provide an effective seal, particularly when a pressure has been developed inside the tire which tends to force the heel 15 against its seat on the ledge 9 and also ensures firm sealing engagement between the toe 17 of the bead and the radially outer surface of the ring 16, the inner region of the ring 16 providing an effective seal against the base 8 of the well.

Whilst in the embodiment described above the well-filling ring is of circular cross-section, and this form is preferred, it is also in accordance with one aspect of the invention to employ a ring of non-circular cross-section, for example of square or hexagonal cross-section. In these latter cases, the base of the rim well would preferably have a profile complementary to that of the well-filling ring.

Having now described my invention — what I claim is:

1. A pneumatic tire and wheel rim assembly comprising:
   (i) a wheel rim having a pair of annular tire bead retaining flanges and a well located adjacent one of said flanges immediately beneath the normal seating position of a tire bead, said well having a base portion substantially semi-circular in axial cross-section;
   (ii) a well-fitting ring, substantially circular in transverse cross-section, located in the well to substantially fill said well;
   (iii) a pneumatic tire on said wheel rim, said tire having a pair of beads having toe portions, the base of one of said beads extending over the well and being supported by said well-filling ring; and
   (iv) the well-filling ring defines with the axially inner surface of the well a circumferential radially inwardly tapering groove which, in the event of said one tire bead being axially displaced from its seat, is entered by the toe portion of said one tire bead to prevent further axial displacement of said one bead.

2. A pneumatic tire and wheel rim assembly as claimed in claim 1 wherein the well-filling ring is formed of an elastomeric material.

3. A pneumatic tire and wheel rim assembly comprising a wheel rim having a pair of annular tire bead retaining flanges and a well, having a base portion substantially semi-circular in axial cross-section, positioned closely adjacent one flange, a well-filling ring, substantially circular in transverse cross-section, in said well to substantially fill said well, the rim being formed with an axially extending ledge between said one flange and the well, a tire having beads with heel and toe portions, said tire being mounted on the wheel rim with the heel portion of one tire bead supported on the ledge and the toe portion of said one bead being positioned over and supported by said well-filling ring located in the well, and the well-filling ring defines with the axially inner surface of the of the well a circumferential radially inwardly tapering groove which, in the event of said one tire bead being axially displaced from its seat, is entered by the toe portion of said one tire bead to prevent further axial displacement of the one tire bead.

* * * * *